United States Patent [19]

Morell et al.

[11] Patent Number: 4,627,570
[45] Date of Patent: Dec. 9, 1986

[54] FUEL INJECTION UNIT FOR EACH CYLINDER OF A DIESEL ENGINE

[75] Inventors: Josef Morell; Harald Schmidt, both of Vienna, Austria

[73] Assignee: Steyr-Daimler-Puch AG, Vienna, Austria

[21] Appl. No.: 577,133

[22] Filed: Feb. 6, 1984

[30] Foreign Application Priority Data

Feb. 17, 1983 [AT] Austria .................................. 541/83

[51] Int. Cl.[4] .......................................... F02M 47/00
[52] U.S. Cl. ..................................... 239/90; 123/499
[58] Field of Search ............................ 239/88–94; 417/490, 494, 499

[56] References Cited

U.S. PATENT DOCUMENTS

| | | | |
|---|---|---|---|
| 2,571,501 | 10/1951 | Truxell, Jr. | 239/90 |
| 2,890,657 | 6/1959 | May et al. | 417/499 |
| 3,635,403 | 1/1972 | Hofken et al. | 239/90 |
| 3,737,100 | 6/1973 | Dreisin | 239/89 |
| 4,163,634 | 8/1979 | Powers | 417/499 |

FOREIGN PATENT DOCUMENTS

| | | | |
|---|---|---|---|
| 334695 | 1/1976 | Austria . | |
| 461348 | 11/1949 | Canada | 239/89 |
| 2302887 | 8/1974 | Fed. Rep. of Germany . | |
| 897782 | 4/1945 | France . | |
| 401949 | 2/1943 | Italy | 417/494 |
| 483468 | 7/1953 | Italy | 239/91 |
| 411353 | 6/1934 | United Kingdom | 417/494 |
| 1159005 | 7/1969 | United Kingdom | 239/90 |
| 1249304 | 10/1971 | United Kingdom . | |
| 1256223 | 12/1971 | United Kingdom . | |
| 1370239 | 10/1974 | United Kingdom . | |
| 1384993 | 2/1975 | United Kingdom . | |
| 1398743 | 6/1975 | United Kingdom . | |
| 968503 | 10/1982 | U.S.S.R. . | |

Primary Examiner—Joseph F. Peters, Jr.
Assistant Examiner—Michael J. Forman
Attorney, Agent, or Firm—Marmorek, Guttman & Rubenstein

[57] ABSTRACT

In a combination which includes a fuel injection unit and a cylinder of a diesel engine provided with a cover, and formed with a fuel bore communicating with a suction chamber, a piston is reciprocally moving within the cylinder, and is provided with a slanted front and rear control edge for regulating the quantity of fuel. The cylinder and piston define piston- and cylinder-surfaces separated from each other by a very small clearance, and are movable relative to each other; an injection nozzle includes a spring-loaded needle, a common casing houses the piston and the cylinder, a securing flange is disposed between the fuel bore and an end of the cylinder facing the cover, a tensioning device stresses the securing flange against the cover, and the piston, during its stroke, passes over the fuel bore. The improvement includes a cylindrically offset recess formed within a region of the securing flange on the cylinder surface, and the front control edge of the piston is formed with a first step-like recess with respect to the piston-surface. Consequently any undesired pressure peaks are avoided within the cylinder, when the piston passes over the fuel bore, while the clearance is substantially maintained between the piston surface and the cylinder surface during the stroke of the piston.

9 Claims, 4 Drawing Figures

U.S. Patent   Dec. 9, 1986   Sheet 1 of 2   4,627,570
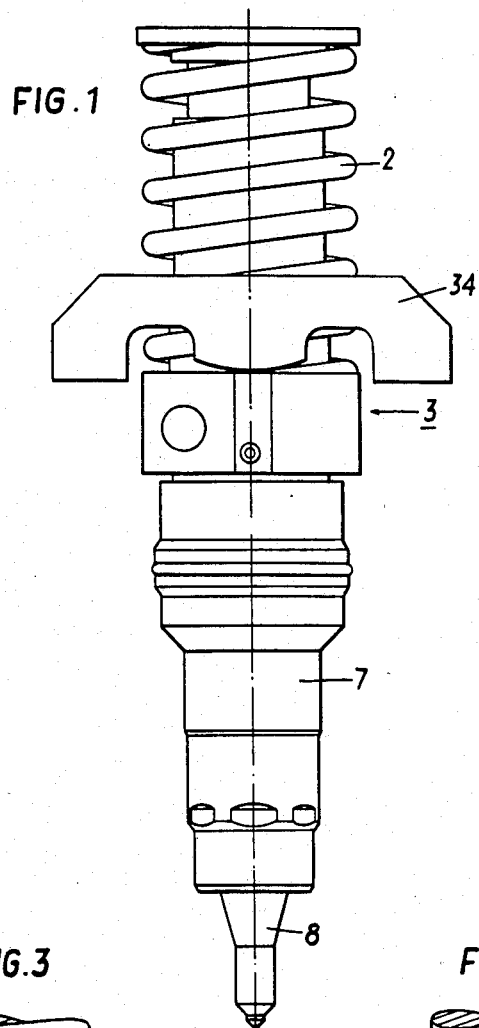
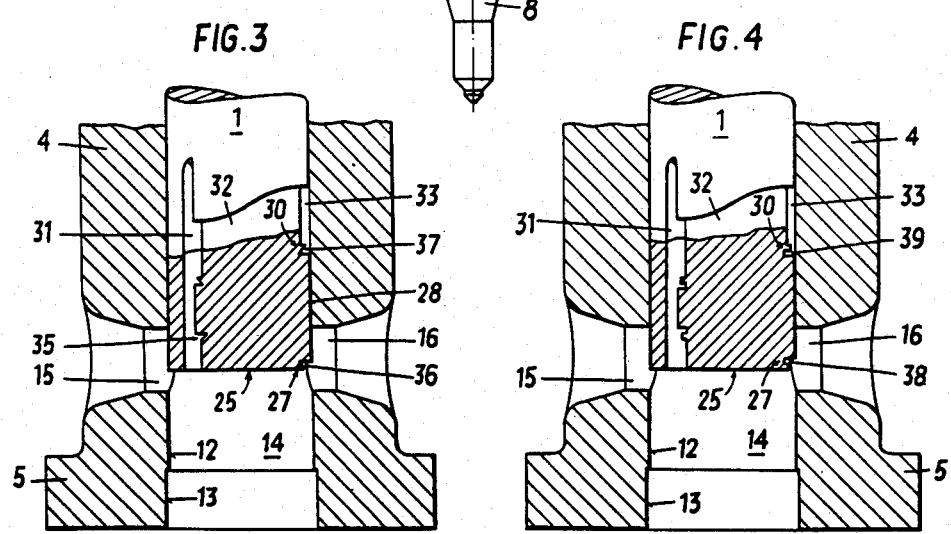

FUEL INJECTION UNIT FOR EACH CYLINDER OF A DIESEL ENGINE

BACKGROUND OF THE INVENTION

The invention relates to a fuel injection unit for each cylinder of a diesel engine, which consists of a piston pump receiving a quantity of fuel which can be regulated by means of a slanted-edge control and of an injection nozzle provided with a spring-loaded nozzle needle, the injection nozzle being arranged in a common housing with the piston pump, and wherein the pump cylinder includes at least one fuel borehole, which communicates with a pump suction chamber and wherein the pump piston is, in turn, provided with a front control edge and rear control edge, the pump cylinder also including a fastening flange which, by means of a tension sleeve or the like, can be held under tension against a pump cylinder cover between the fuel borehole and the pump-cylinder end facing the cover, the piston pump, during a stroke thereof, passing the fuel borehole.

In the case of known injection units of this type, the regulation of the quantity of fuel to be injected, takes place through rotation of the pump piston. When, during the stroke of the piston, its front control edge passes over the fuel borehole in the pump cylinder, the inside area of the pump cylinder is closed-off and the fuel injection begins. It lasts up to the time when the rear control edge has reached, and releases the fuel borehole. Through a longitudinal groove or the like in the pump piston, the fuel enclosed within the interior of the cylinder can then escape into the pump suction chamber during the remaining stroke of the pump piston, so that the fuel pressure steeply decreases, and the injection nozzle is again closed by the spring-loaded nozzle needle.

For the attainment of as favorable a combustion course as possible, in particular in the case of modern diesel engines with direct fuel injection, high injection pressures of more than 1000 bars are strived for, which can only be attained in the case of a narrow slit being formed between the pump piston and the pump cylinder having a maximum diversion of 1.5 $\mu$m. For the sealing of the pump cylinder with respect to the pump cylinder lid, the high injection pressures require a high initial pressure or prestress acting on the fastening flange, but therein such high injection pressures may in turn, cause a constriction of the working surface of the pump cylinder, which again imposes the utilization of an undesirably great play or clearance of the pump piston. As a result of this unduly large play, an irregular fuel feed, which depends on the stroke of the pump piston and on the engine revolutions can occur, which in turn adversely affects the accuracy of the injection process. Moreover, the sudden steep pressure increase in the pump cylinder, after closure of the fuel borehole, covers a risk of pressure fluctuations, which require a still higher initial pressure and lead to further inaccuracies at the beginning of the injection, as well as during the injection or at the end of the injection. These disadvantageous effects show up in particular in diesel engines of vehicles which are operated at a broad range of the number of revolutions, with a high peak in the number of revolutions, and, in the case of fuel injection units of the initially cited type, are of great importance, since after installation in the diesel engines, these fuel injection units can no longer be re-adjusted.

SUMMARY OF THE INVENTION

It is therefore an object of the invention to eliminate these shortcomings, and to improve a fuel injection unit of the initially cited type in such a manner, so that any leakages in the piston pump can be held down as much as possible, and that an accurate maintenance of the desired injection process can be attained also at high injection pressures.

The invention attains the above-set object so that, in the area of the securing flange, the working surface of the pump cylinder includes a cylindrically offset section of an increased diameter, and so that preferably the front control edge of the pump piston, while being formed with a step-like offset section or recess with decreased diameter, is set back with respect to the working surface of the piston.

Thus, upon a great prestress or pressure being created on the securing flange, the constriction of the cylinder's working surface becomes so severe, that the desired slight play of the pump piston can no longer be maintained, but there, through the cylindrical offset section or recess of the cylinder's working surface, the required space is created in the area of the constriction which prevents any wedging of the piston and maintains at most a small play of 1.5 $\mu$m; nevertheless, in the remaining portion of the cylinder's working section the play of the piston, in order to avoid any leaks, can also be selected to have as small an order of magnitude as the manufacturing processes will allow. The required accuracy of the injection process is therewith assured. Through the setback of the front-side control edge, and through the offset section having a decreased diameter in the piston's working surface formed thereby, the pressure increase in the pump interior is levelled off to such an extent that, while passing over the fuel borehole in the pump cylinder, only slight pressure peaks can occur.

Consequently, the required initial prestress or pressure does not have to be set considerably higher than is demanded by the required injection pressure. Consequently, the offset section of the pump-cylinder's working surface can be kept small and be accurately dimensioned.

In accordance with the invention, a further improvement results in that the rear edge of the pump piston, while having a step-like offset section or recess with decreased diameter, is set back with respect to the piston's working surface. Consequently, during the opening of the fuel borehole in the pump cylinder, formation of any possible pressure peaks at the end of the injection process due to too rapid a pressure decrease are avoided, which can lead to any excessive prestressing force exerted on the fastening flange of the pump cylinder, and therewith, in turn can lead to a more intensive abrasion of the pump-cylinder's working surface, as well as to difficulties in accurately dimensioning the same.

In an embodiment of the invention which can be easily manufactured, the mantle surfaces of the offset sections have a cylindrical form. However, selectable respective progressions of the pressure build-up or pressure drop within the pump cylinder can be attained when, in accordance with the invention, the step-like offset sections have a labyrinth-like cross-sectional progression, or when each mantle surface of the step-like off-set sections is formed as a truncated cone surface.

It is expedient when, in a further development of the invention, the length of the cylindrical offset section of the pump-cylinder's working surface amounts at least to two thirds of the thickness of the fastening flange, and when the mantle surface or surfaces of the cylindrical offset section of the pump-cylinder's working surface, as well as of the step-like offset sections of the pump piston or of the thickest region thereof, have respective diameters, which deviate at most by 4% from the diameter of the piston's working surface. Consequently, while a lowest possible play is maintained, any undesirable constriction of the pump-cylinder's working surface is prevented and any pressure peaks, manifesting themselves perhaps when the pump-cylinder's interior is closed or is released, are largely avoided thereby.

BRIEF DESCRIPTION OF THE DRAWING

Further characteristics and advantages of the invention will become evident from the following, explanatory description of exemplified embodiments illustrated in the drawing, in which FIG. 1 is an elevation view of a fuel injection unit, FIG. 3 is a fragmentary longitudinal section of a first alternate embodiment of the piston according to FIG. 2; and FIG. 4 is a fragmentary longitudinal section of a second alternate embodiment of the piston according to FIG. 2.

DESCRIPTION OF THE PREFERRRED EMBODIMENTS

Figure 2:
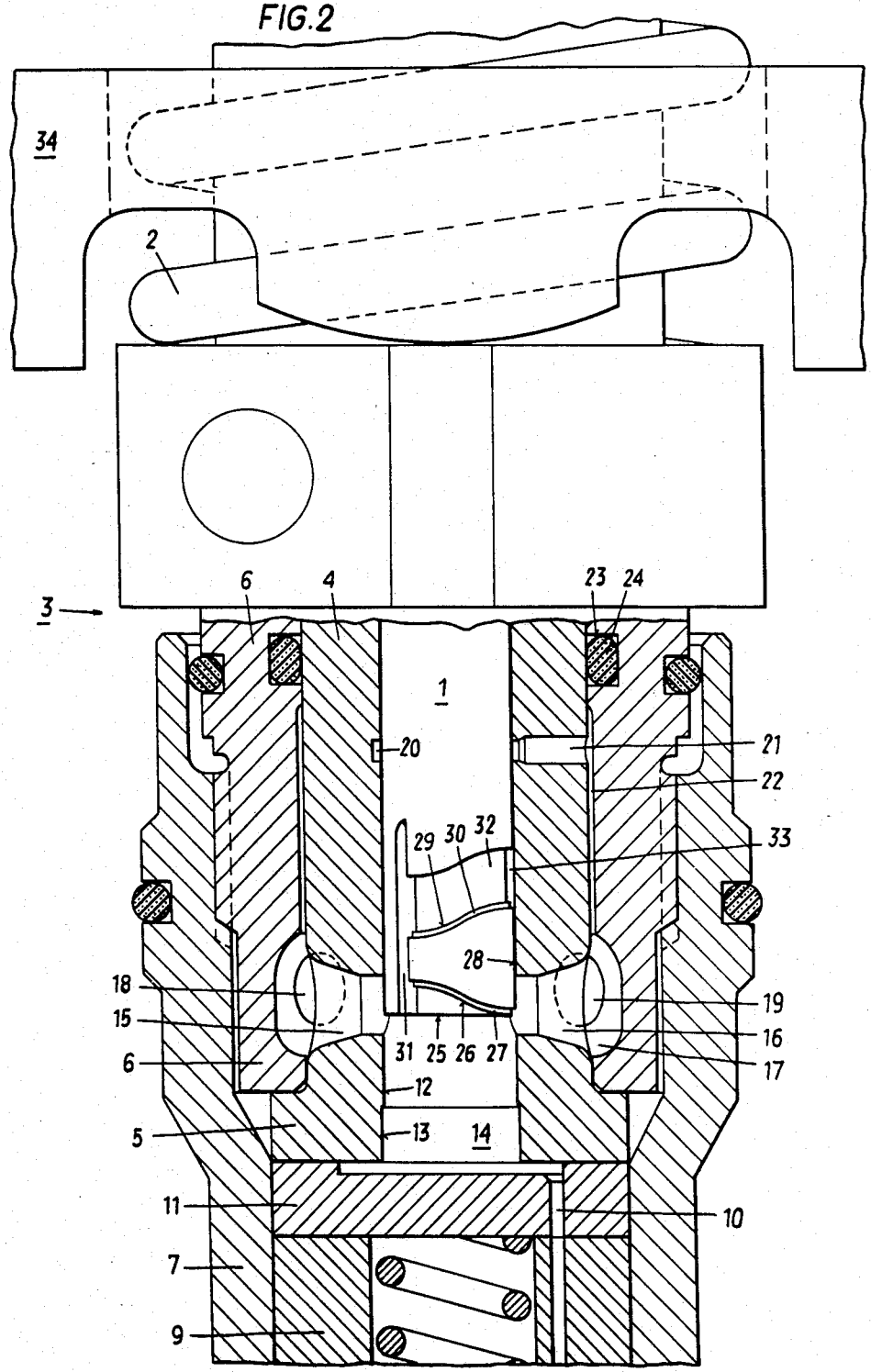
FIG. 2 is a large scale fragmentary longitudinal section along the center axis of FIG. 1.

According to FIGS. 1 and 2 a pump piston 1 of a piston pump 3 of a fuel injection unit, which is held in an upper position by means of a spiral spring 2, is guided in a longitudinally displaceable manner within a pump-cylinder 4, which includes a fastening or securing flange 5 at its lower extremity. By means of a tension sleeve 6 and a housing 7 which can be threaded onto the tension sleeve 6 from the outside, the fastening flange, is pressed by means of an injection nozzle 8 and a spring sleeve 9 against a pump-cylinder cover or lid 11, which includes a fuel feed line 10 to the injection nozzle.

In the area of the fastening flange 5, the pump-cylinder's working surface 12 includes a cylindrical offset section 13 of a pump pressure chamber 14 and, is connected in the area thereof, namely through radial boreholes 15, 16 of the pump-cylinder area 4, which lead to a ring-shaped pump suction chamber 17 of the tension sleeve 6, to boreholes 18 or 19 emanating from the tension sleeve 6, for the purpose of receiving or discharging fuel. A ring-shaped internal duct 20 of the pump cylinder 4, serving for any fuel leakage uptake, communicates with a pump suction area 17, through a borehole 21 and a ring-shaped channel 22. Between the tension sleeve 6 and the pump-cylinder 4, there is disposed an O-ring 24 within a groove 23 of the tension sleeve 6. For the sealing of the pump-cylinder 4 with respect to the tension sleeve 6. At its lower extremity 25, the pump piston 1 is formed with a front control edge 26, which extends in a slanted manner along a portion of its periphery and, while being formed with a step-like offset section or recess 27 of reduced diameter, is set back with respect to the piston's working surface 28. An additional rear control edge 29 which extends in a slanted manner along a portion of the periphery of the pump piston 1, is likewise set back or recessed with respect to the piston's working surface 28, while forming a step-like offset section or recess 30 of decreased diameter. Through a longitudinal groove 31 of the pump piston 1 in its area of the lower extremity 25, a ring-shaped chamber 33 communicates with the pump-pressure-chamber 14, and wherein the ring-shaped chamber 33 adjoins rearwardly the rear control edge 29 and is formed by a further offset section 32 or recess of the pump piston 1, which has a decreased diameter there, and by the pump-cylinder's working surface 12. A mounting seat 34 serves for the mounting of the injection unit to a diesel engine's cylinder lid, which is not illustrated.

According to FIG. 3, the mantle surfaces 35 of the step-like offset sections or recesses 27 or 30 are formed as truncated cone surfaces 36 or 37, respectively.

According to FIG. 4, the step-like offset sections or recesses 27 or 30 have labyrinth-like varying cross-section 38 or 39, respectively, as seen along a longitudinal cross-section of the piston pump.

I wish it to be understood that I do not desire to be limited to the exact details of construction shown and described, for obvious modifications will occur to a person skilled in the art.

We claim:

1. A fuel injection unit for each cylinder of a diesel engine, said fuel injection unit comprising a housing,
   a pump cylinder within said housing, said pump cylinder having an inner wall defining a working surface having a predetermined inner diameter,
   a section chamber communicating fuel to said pump cylinder through a fuel bore,
   an injection nozzle communicating with said pump cylinder, said injection nozzle having a spring-loaded needle valve for delivery of fuel from said pump cylinder to said diesel engine cylinder,
   a cover disposed between an end of said pump cylinder and said injection nozzle,
   a securing flange disposed between said fuel bore and said cover,
   tensioning means for stressing said securing flange against said cover, and
   a piston disposed within said pump cylinder, said piston including a front end facing said cover, said piston having a peripheral surface having a predetermined outer diameter, said peripheral surface separated from said working surface of said pump cylinder by a very small clearance, said piston being rotatably and reciprocally movable within said pump cylinder, said piston passing over said fuel bore with its front end during its reciprocal movement within said pump cylinder, said piston being provided with slanted front and rear control edges for regulating the quantity of fuel communicated to said pump cylinder through said fuel bore, said slanted front control edge being located adjacent to said front end of said piston,
   wherein said pump cylinder includes a cylindrically offset region of said working surface having an inner diameter which is larger than said predetermined inner diameter, said region of enlarged inner diameter being located opposite to said securing flange, and
   wherein said front control edge of said piston is formed on the peripheral surface of said piston with a first recess and a step adjacent thereto, so that the outer diameter of said first recess and step are smaller than said predetermined outer diameter.

2. The fuel injection unit of claim 1, wherein said rear control edge of said piston is formed on the peripheral surface of said piston with at least one second recess and a step adjacent thereto, so that the outer diameter of said second recess and step are smaller than said predetermined outer diameter.

3. The fuel injection unit of claim 2, wherein said recesses and steps have a labyrinth structure as seen along a longitudinal cross-section of said piston.

4. The fuel injection unit of claim 2, wherein each recess and step has a cross-section in the shape of a truncated cone.

5. The fuel injection unit of claim 2, wherein said securing flange has a predetermined thickness, wherein said clearance is very small compared to said predetermined outer diameter of said piston, so that the peripheral surface of said piston and the working surface of said pump cylinder each have substantially equal predetermined diameters, wherein said region of enlarged inner diameter of said pump cylinder has a length equal to at least two-thirds of said predetermined thickness, and wherein said inner surface of said region of enlarged inner diameter of said pump cylinder and the upper surfaces of each of said steps have outer diameters deviating from said predetermined diameter by at most 4%.

6. A fuel injection unit for each cylinder of a diesel engine, said fuel injection unit comprising a housing,
a pump cylinder within said housing, said pump cylinder having an inner wall defining a working surface having a predetermined inner diameter,
a suction chamber communicating fuel to said pump cylinder through a fuel bore,
an injection nozzle communicating with said pump cylinder, said injection nozzle having a spring-loaded needle valve for delivery of fuel from said pump cylinder to said diesel engine cylinder,
a cover disposed between an end of said pump cylinder and said injection nozzle,
a securing flange disposed between said fuel bore and said cover,
tensioning means for stressing said securing flange against said cover, and
a piston disposed within said pump cylinder, said piston including a front end facing said cover, said piston having a peripheral surface having a predetermined outer diameter, said peripheral surface separated from said working surface of said pump cylinder by a very small clearance, said piston being rotatably and reciprocally movable within said pump cylinder, said piston passing over said fuel bore with its front end during its reciprocal movement within said pump cylinder, said piston being provided with slanted front and rear control edges for regulating the quantity of fuel communicated to said pump cylinder through said fuel bore, said slanted front control edge being located adjacent to said front end of said piston,
wherein said pump cylinder includes a cylindrically offset region of said working surface having an inner diameter which is larger than said predetermined inner diameter, said region of enlarged inner diameter being located opposite to said securing flange,
wherein said front control edge of said piston is formed on the peripheral surface of said piston with a first recess and a step adjacent thereto, so that the outer diameter of said first recess and step are smaller than said predetermined outer diameter,
wherein said securing flange has a predetermined thickness,
wherein said clearance is very small compared to said predetermined outer diameter of said piston, so that the peripheral surface of said piston and the working surface of said pump cylinder each have substantially equal predetermined diameters,
wherein said region of enlarged inner diameter of said pump cylinder has a length equal to at least two thirds of said predetermined thickness, and
wherein said inner surface of said region of enlarged inner diameter of said pump cylinder and the surface of said step have diameters deviating from said predetermined diameter by at most 4%.

7. The fuel injection unit of claim 6, wherein said rear control edge of said piston is formed on the peripheral surface of said piston with at least one second recess and a step adjacent thereto, so that the outer diameter of said second recess and step are smaller than said predetermined outer diameter, the upper surface of said second step having a diameter deviating from said predetermined diameter by at most 4%.

8. The fuel injection unit of claim 7, wherein said recesses and steps have a labyrinth structure as seen along a longitudinal cross-section of said piston.

9. The fuel injection unit of claim 7, wherein each recess and step has a cross-section in the shape of a truncated cone.

* * * * *